United States Patent [19]
Johnston et al.

[11] Patent Number: 5,414,707
[45] Date of Patent: May 9, 1995

[54] BROADBAND ISDN PROCESSING METHOD AND SYSTEM

[75] Inventors: Cesar A. Johnston, Morristown; David J. Smith, Scotch Plains; Kenneth C. Young, Jr., Morris Plains, all of N.J.

[73] Assignee: Bell Communications Research, Inc., Livingston, N.J.

[21] Appl. No.: 160,526

[22] Filed: Dec. 1, 1993

[51] Int. Cl.⁶ .................... G06F 13/00; H04L 12/28
[52] U.S. Cl. ...................... 370/79; 370/94.1; 395/425
[58] Field of Search .............. 370/58.1, 58.2, 58.3, 370/60, 60.1, 79, 94.1, 94.2; 395/200, 325, 375, 425, 800

[56] References Cited

U.S. PATENT DOCUMENTS

| | | | |
|---|---|---|---|
| 5,067,123 | 11/1991 | Hyodo et al. | 370/60 |
| 5,101,404 | 3/1992 | Kunimoto et al. | 370/60 |
| 5,280,476 | 1/1994 | Kojima et al. | 370/60.1 |
| 5,289,579 | 2/1994 | Punj | 370/94.1 |

Primary Examiner—Alpus Hsu
Attorney, Agent, or Firm—Leonard Charles Suchyta; Loria B. Yeadon

[57] ABSTRACT

Method and system are provided for processing B-ISDN transfer protocols in a telecommunication system utilizing a generic ATM/AAL interface having a programmable electronic circuit. At the ATM Adaptation Layer (AAL), segmentation and reassembly, and convergence sublayer protocols have been developed to support the different service types to be handled. The interface facilitates a cost effective yet relatively simple broadband ATM/AAL terminal adapter that performs ATM and ATM Adaptation Layer processing in a very flexible manner. The terminal adapter handles several different transfer protocols (AAL types 1, 3, 4 and 5) using a single architecture on a per protocol data unit (PDU) basis and may be implemented using field programmable gate arrays and off-the-shelf components. The method and system is flexible enough to support changes in existing, new and future AAL/ATM standards.

21 Claims, 8 Drawing Sheets

BROADBAND ISDN PROCESSING METHOD AND SYSTEM

CROSS-REFERENCE TO RELATED APPLICATION

This application is related to U.S. patent application entitled "Method and System for Managing Memory in a High Speed Network", filed Dec. 1, 1993, having Ser. No. 08/160,525, and assigned to the assignee of the present application.

TECHNICAL FIELD

This invention relates to methods and system for processing transfer protocols in a telecommunication system and, in particular, to methods and system for processing B-ISDN transfer protocols in a telecommunication system.

BACKGROUND ART

Broadband ISDN (B-ISDN) networks are expected to support a wide variety of services, including voice, data, video and multimedia, on a single network platform with standardized interfaces. One current area of intense research interest is whether B-ISDN protocols can be used to satisfy the requirements of gigabit/-second computer communications. If this is shown to be feasible, gigabit applications may become widespread since it is anticipated that B-ISDN networks will be widely deployed.

The B-ISDN Protocol Reference Model provides a framework for B-ISDN protocols in the form of a layered communication architecture. The lowest layer is the Physical Layer, which is based on the Synchronous Optical Network (SONET)/Synchronous Digital Hierarchy (SDH). SONET/SDH defines a standard set of optical interfaces for transport of data over a network. The next higher layer is the Asynchronous Transfer Mode (ATM) Layer, which provides for the transfer of fixed-size data units (cells) between source and destination with an agreed-upon grade of service. Both the Physical and ATM Layers are service-independent.

The third B-ISDN layer is the ATM Adaptation Layer (AAL) which is responsible for adapting different higher-layer services to the ATM layer. The AAL is service-dependent and as a result several different types of AALs have been defined to handle services with different characteristics. These characteristics include both constant (CBR) and variable bit rates (VBRs), connectionless and connection-oriented, and timing requirements between source and destination. Currently, five AAL types have been defined.

From the point of view of constructing user-network interfaces, it may be desirable to implement several or all of the AAL types within a single interface. Furthermore, it may also be desirable to support a flexible interface to allow for future changes in AAL formats as well as new AALs to be developed. Hence, this would allow a great deal of flexibility in terms of the services that the interface could provide.

SUMMARY OF THE INVENTION

An object of the present invention is to provide a method and system which supports different services by unifying the different protocol functions needed by the AAL layer and the ATM layer of a B-ISDN network into a single generic architecture.

Preferably, the method and system are carried out by a generic B-ISDN programmed electronic circuit.

In carrying out the above object and other objects of the present invention, in a high speed telecommunications network, a method is provided for processing different transfer protocols including a desired transfer protocol on a per protocol data unit (PDU) basis. The protocols support different service types to be handled by the network. The method includes the step of providing a programmable electronic circuit including an input port, an output port and a programmable internal architecture. The input port receives data from a service interface and the output port provides formatted data to a high speed network interface. The method also includes the steps of storing instructions in a memory which instructions correspond to different internal architectures of the electronic circuit and retrieving a set of instructions from the memory corresponding to a desired architecture of the electronic circuit. The method finally includes the step of controlling the programmable electronic circuit in response to said set of instructions to obtain the desired architecture of the electronic circuit. The desired architecture is capable of processing data having a format corresponding to the desired transfer protocol on the per PDU basis.

Further in carrying out the above objects and other objects of the present invention, a system is provided for carrying out each of the above-noted method steps.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 2a and 2b are schematics illustrating segmentation and reassembly (SAR) sublayers and ATM layer formats for CBR and VBR services, respectively, wherein:

| | |
|---|---|
| CH—ATM Cell Header | SN—Sequence Number |
| SH—SAR Header | SNP—SN Protection |
| ST—SAR Trailer | MID—Message Identification |
| CB—ATM Cell Body | CSH—CS Header |
| CRC—Cyclic Redundancy Check | CST—CS Trailer |

Figure 3:
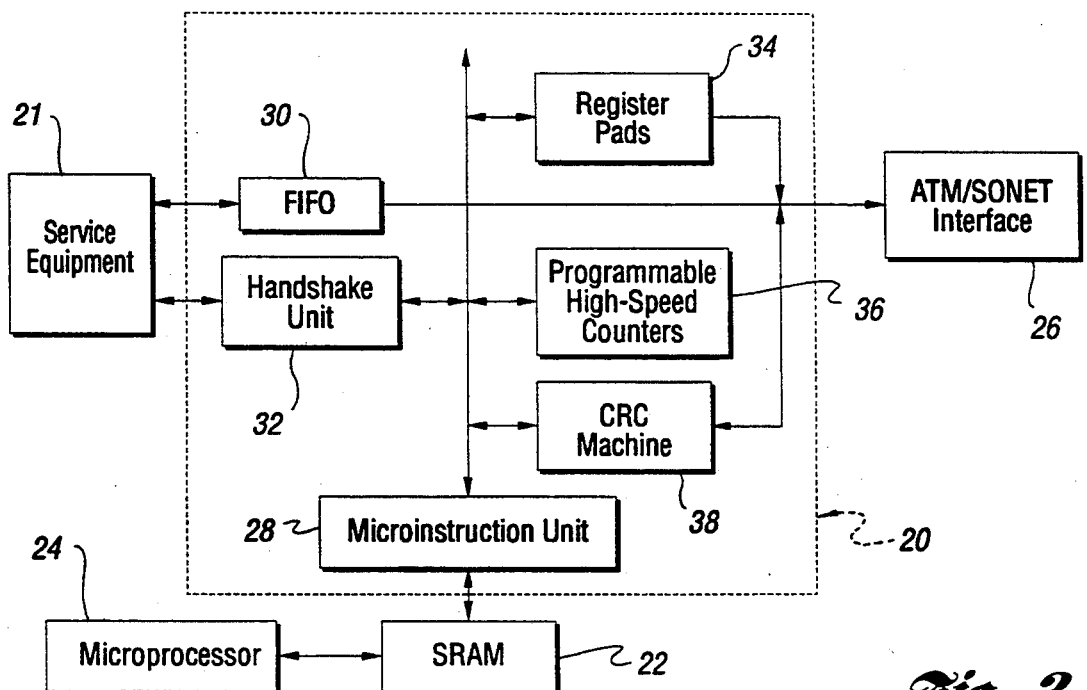
Figure 4:
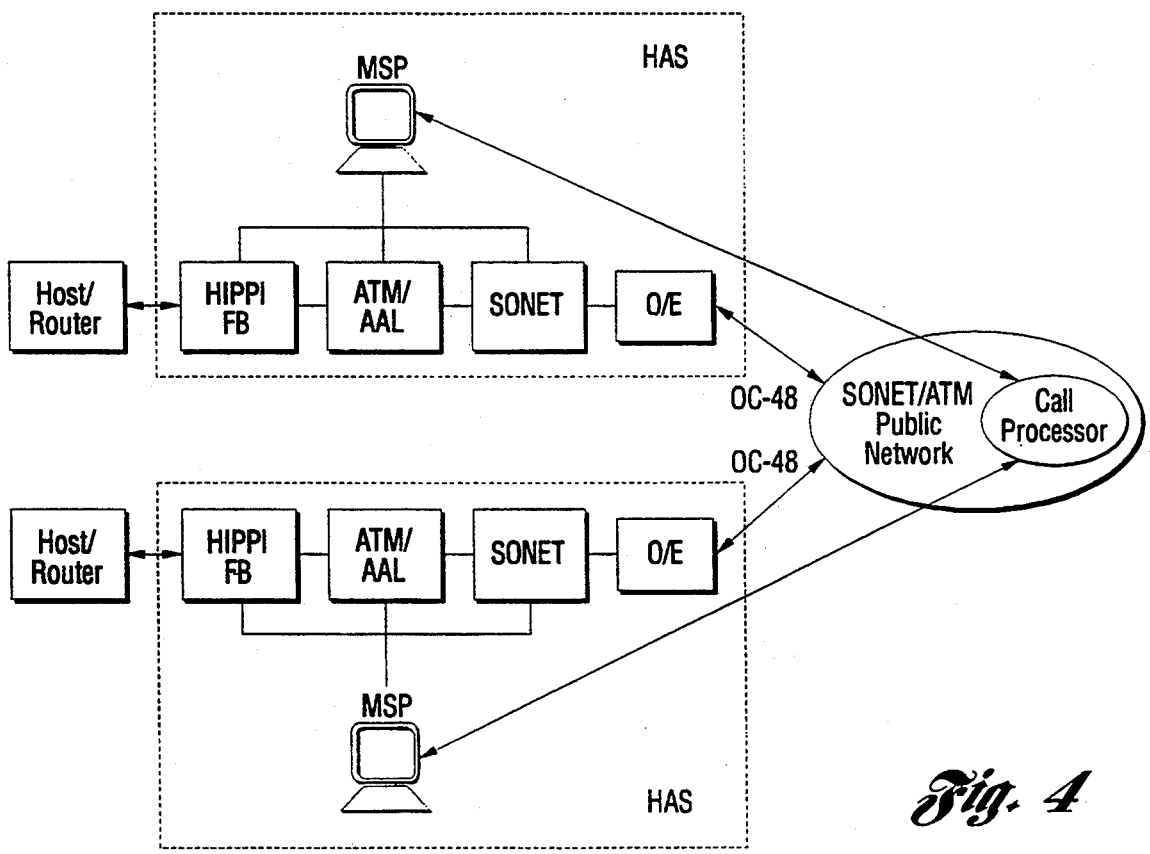
Figure 5A:
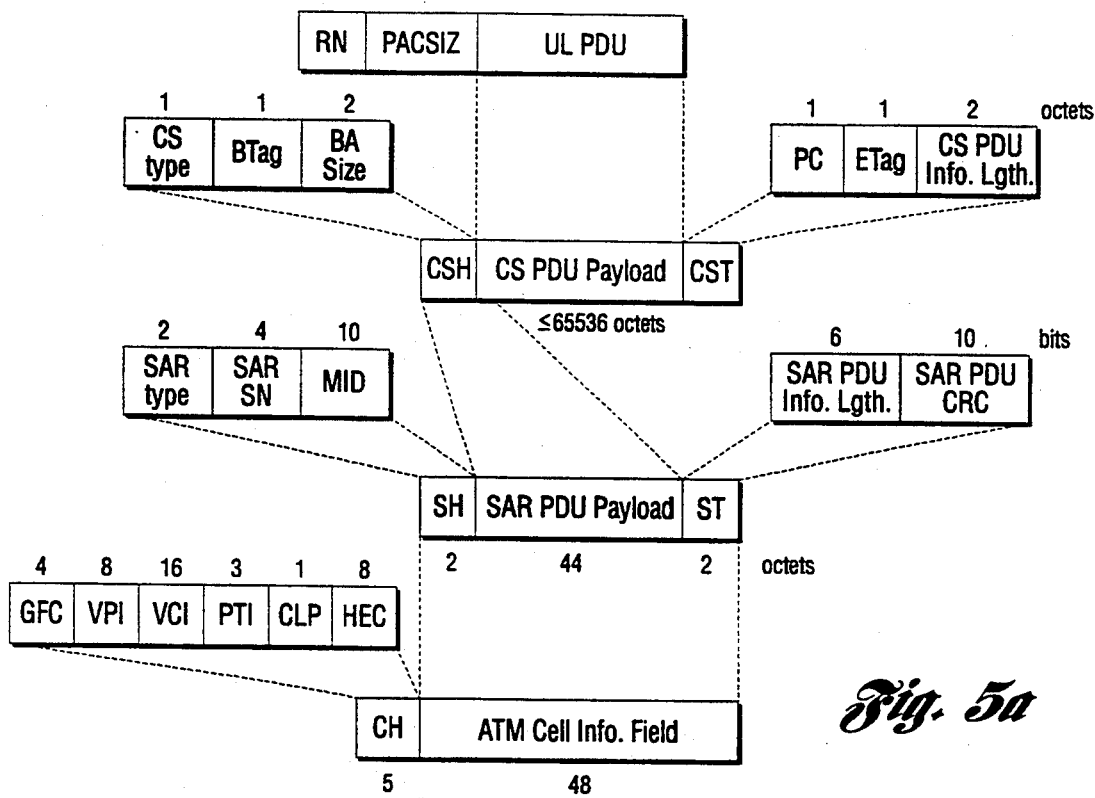
Figure 5B:
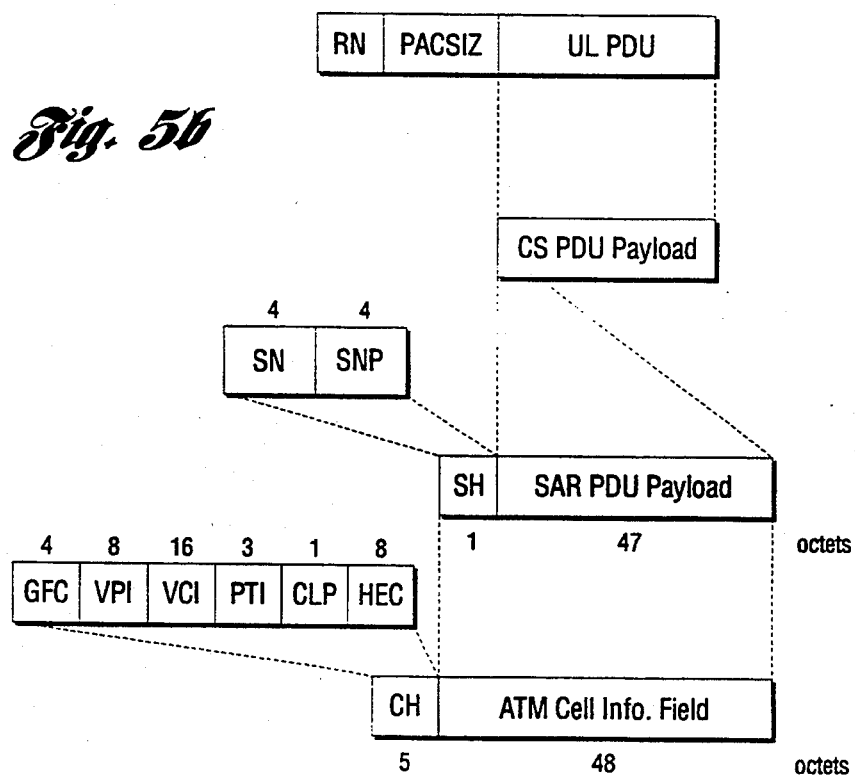

FIG. 3 is a schematic block diagram illustrating the architecture of a B-ISDN microprogrammable machine of the present invention;

FIG. 4 is a schematic block diagram of a HIPPI/ATM/SONET (HAS) network interface where the present invention is utilized;

FIGS. 5a and 5b are schematics illustrating VBR and CBR protocol processing, respectively, wherein:

| | |
|---|---|
| RN—Reference Number | SNP—SN Protection |
| PACSIZ—Packet Size | GFC—Generic Flow Control |
| UL PDU—Upper Layer Protocol Data Unit | VPI—Virtual Path Identifier |
| SN—Sequence Number | VCI—Virtual Channel Identifier |
| PTI—Payload Type Identifier | BA Size—Buffer Allocation Size |

-continued

Figure 6:
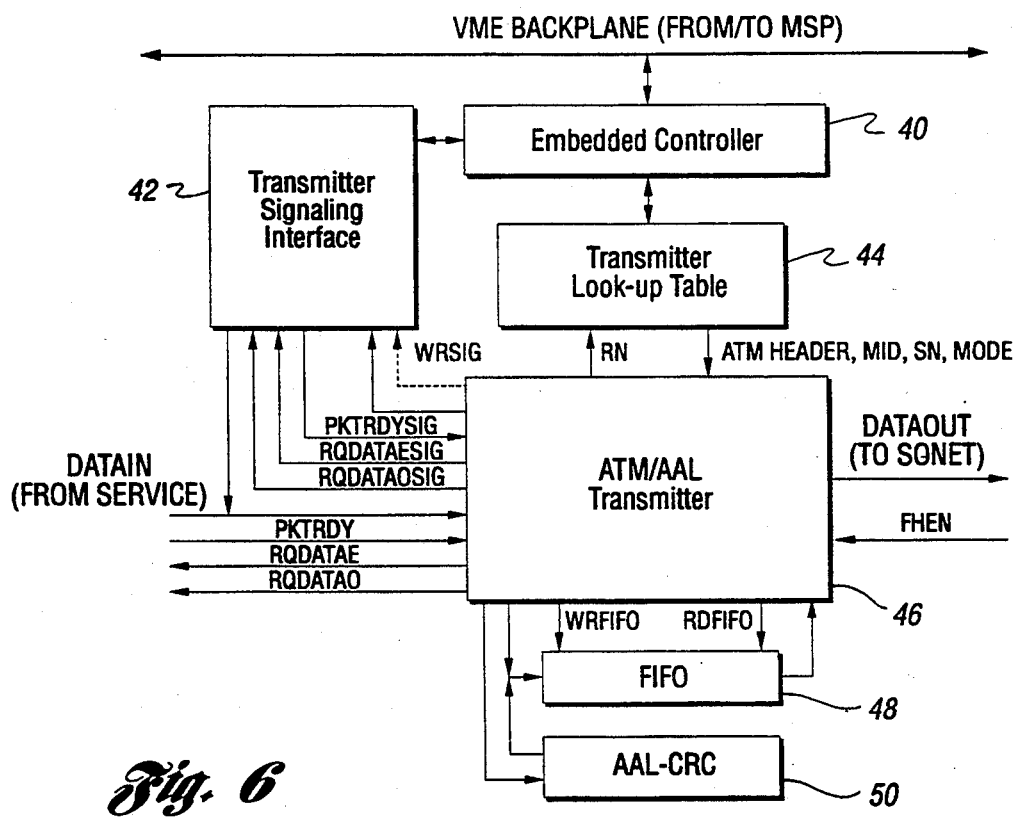
Figure 7:
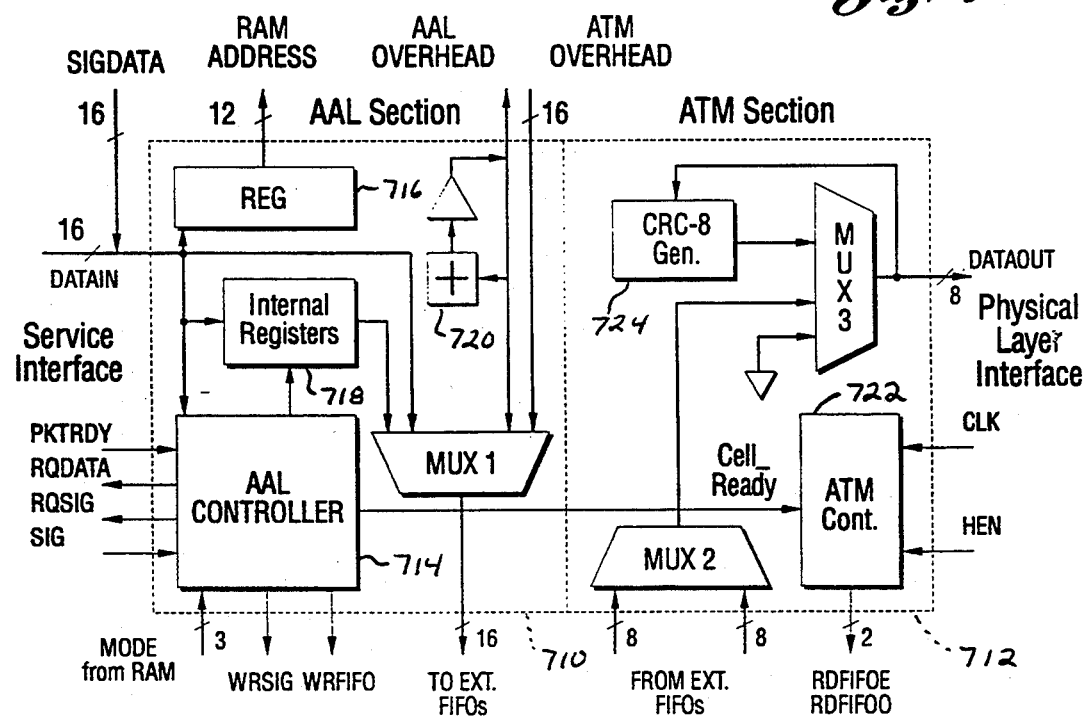
Figure 8:
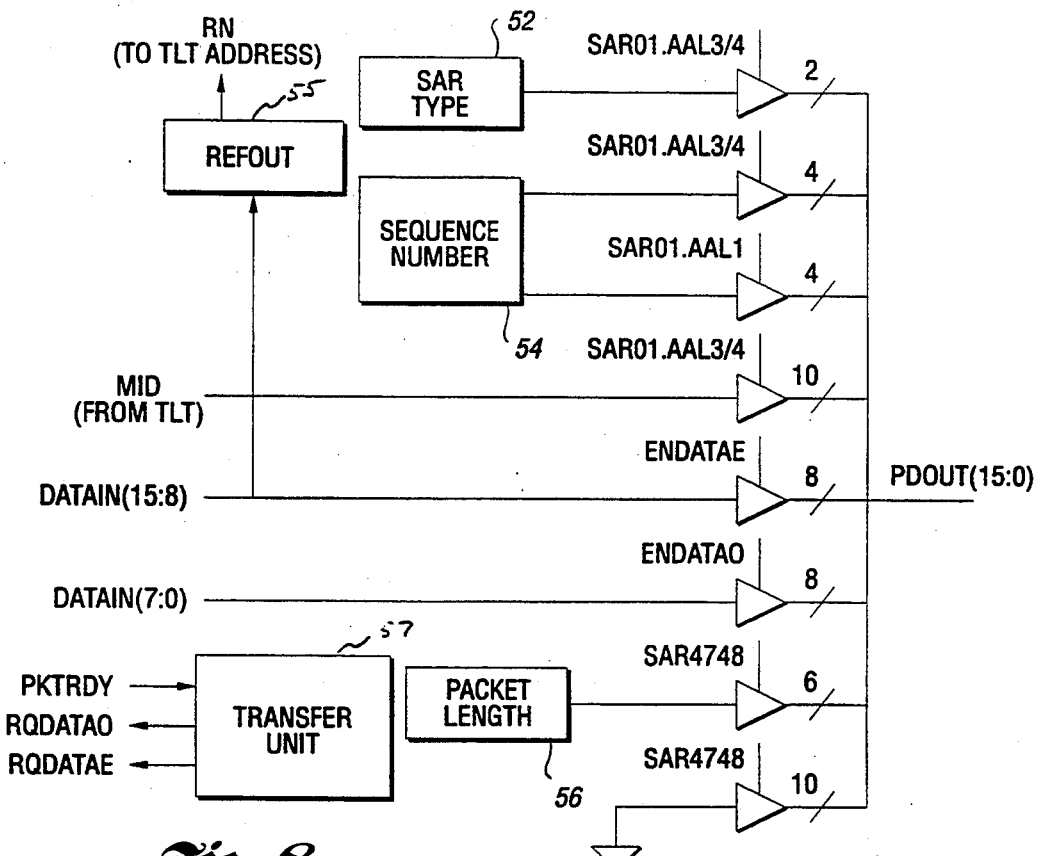
Figure 9:
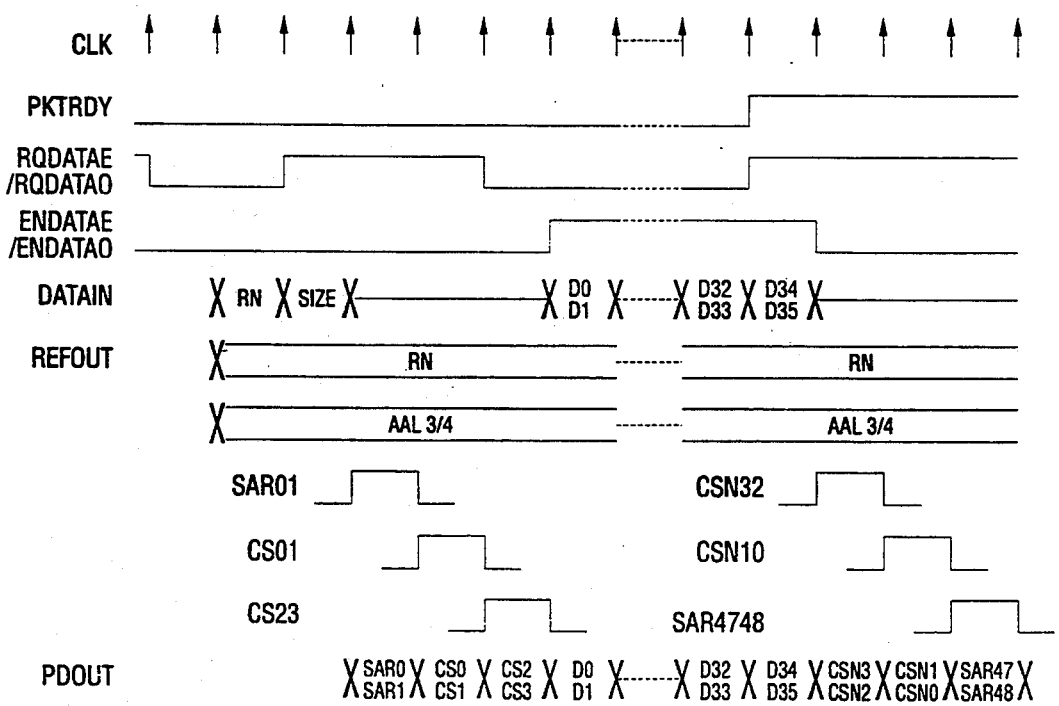
Figure 10:
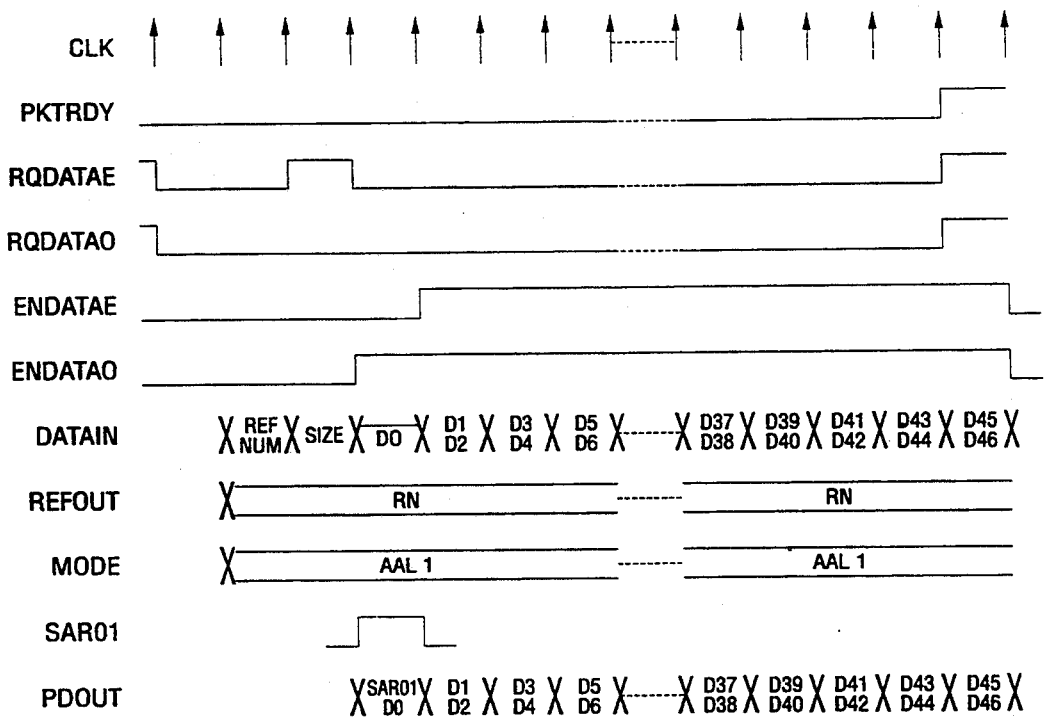
Figure 11:
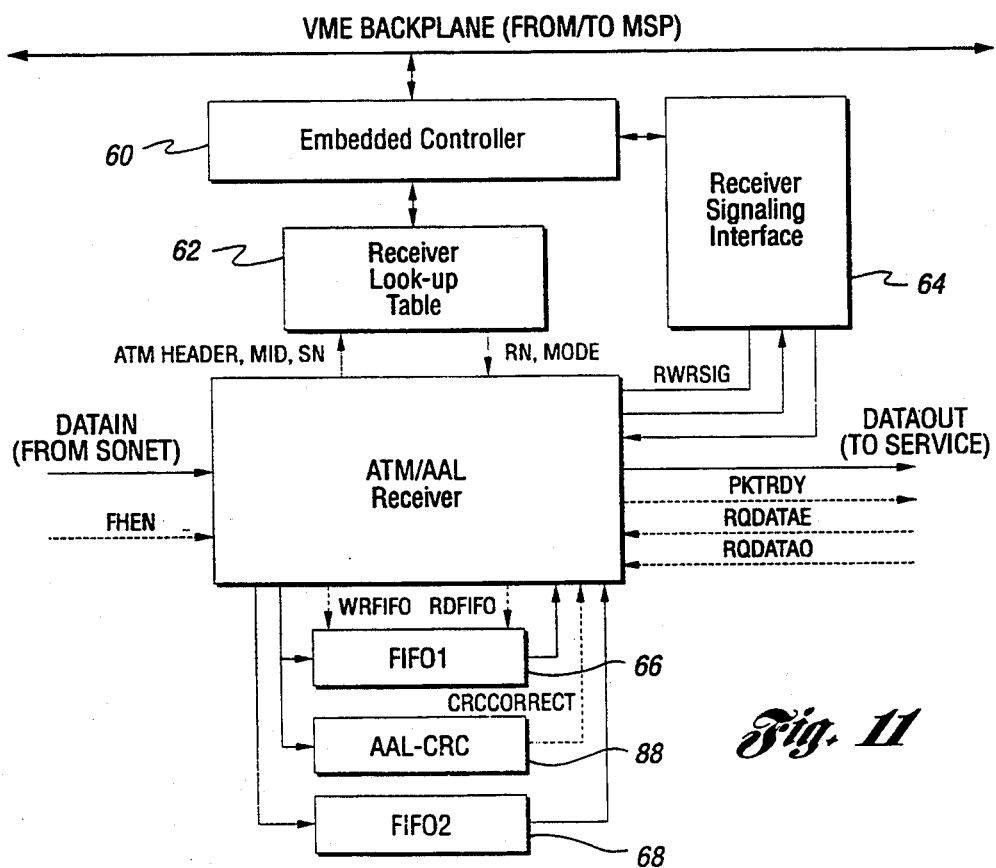
Figure 12:
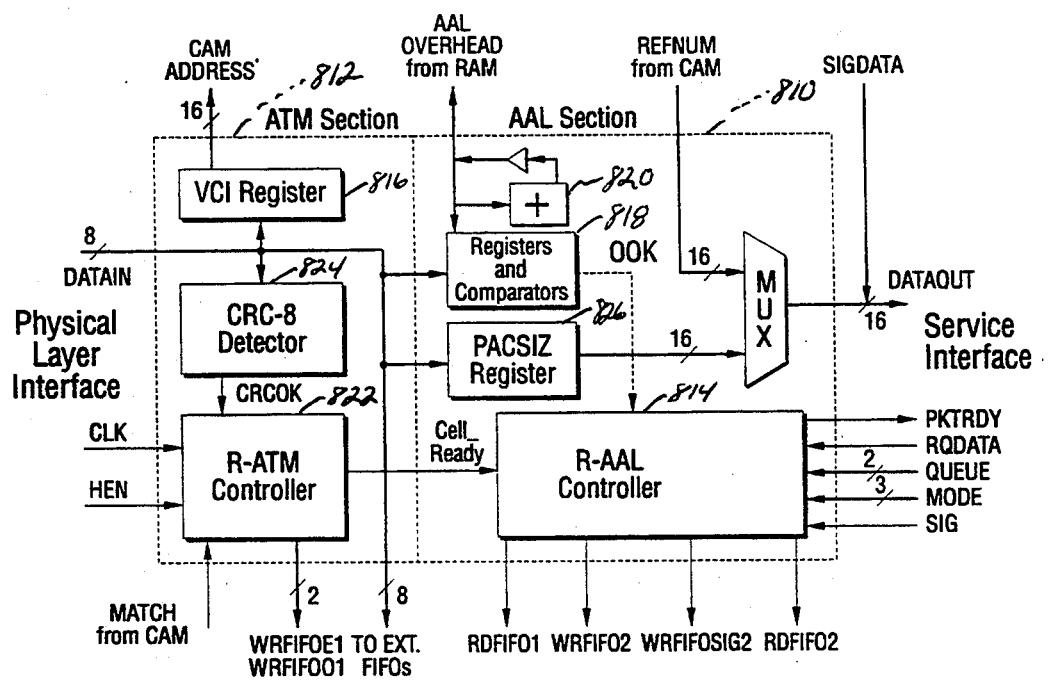
Figure 13:
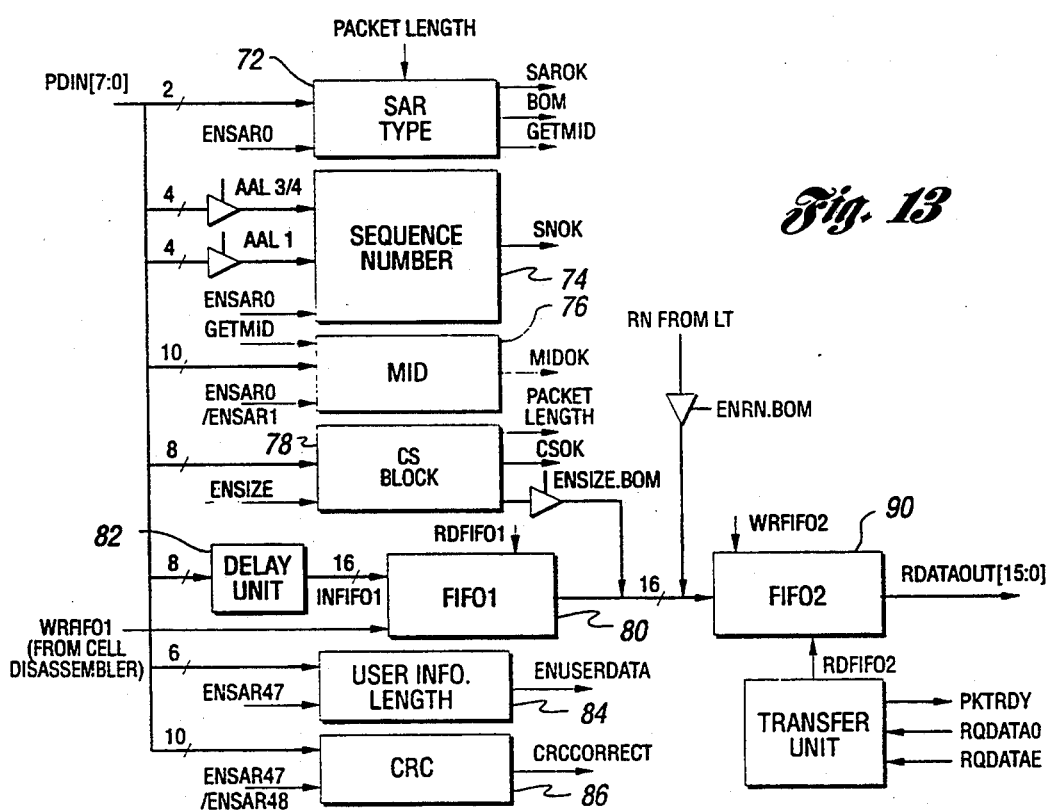
Figure 14:
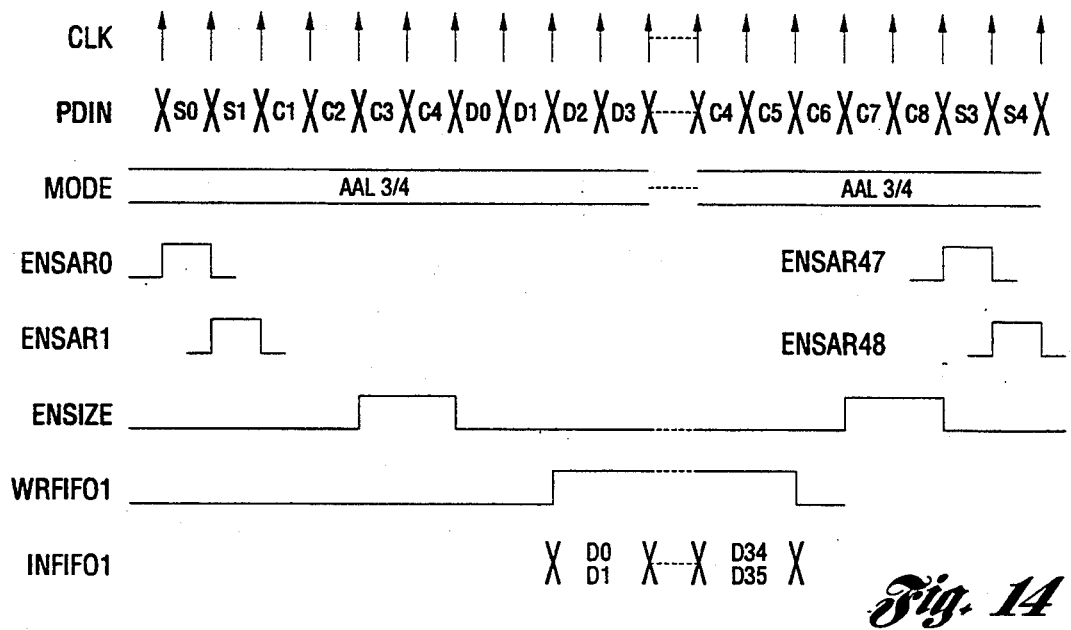
Figure 15:
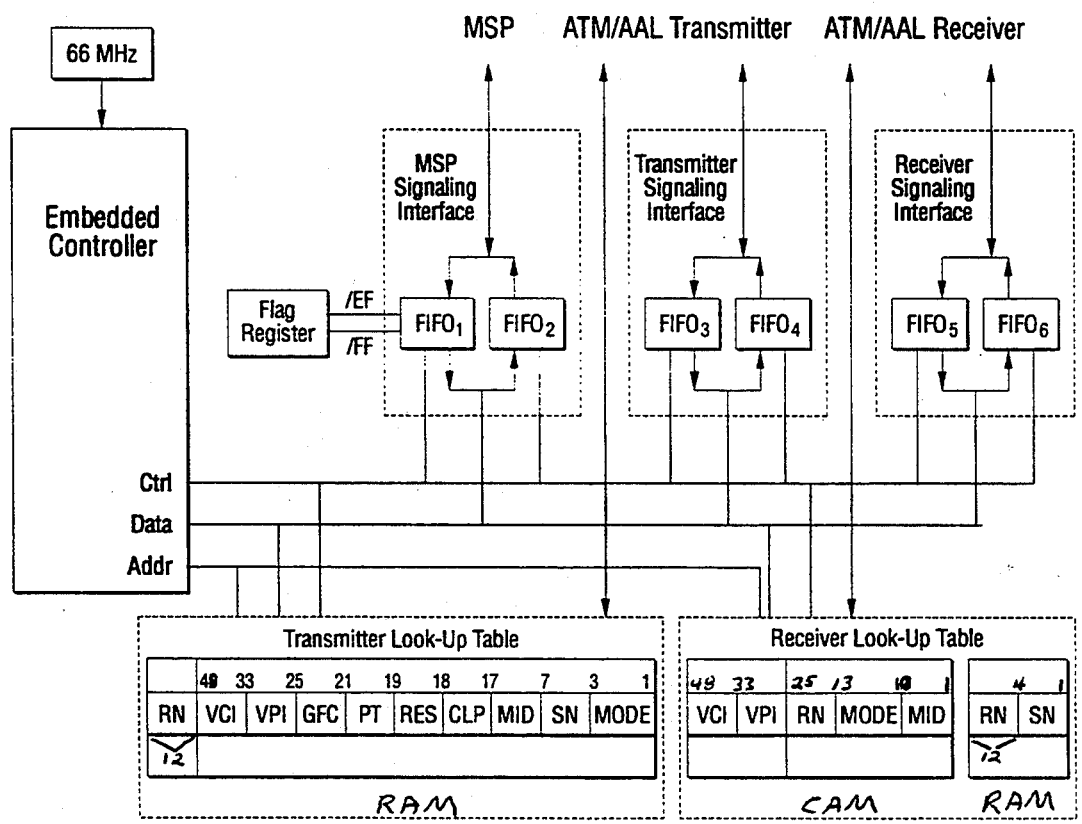

CLP—Cell Loss Priority  PC—Protocol Control
HEC—Header Error Control  MID—Message Identifier FIG. 6 is a schematic block diagram of the ATM/-AAL transmitter interface of the present invention;

FIG. 7 is a simplified internal schematic block diagram of the ATM/AAL transmitter block in FIG. 6;

FIG. 8 is a schematic block diagram illustrating the simplified AAL portion of the transmitter data path architecture;

FIG. 9 is the timing diagram of the AAL portion of the transmitter in AAL 3/4 mode of operation;

FIG. 10 is the timing diagram of the AAL portion of the transmitter in AAL 1 mode of operation;

FIG. 11 is a schematic block diagram of the ATM/-AAL receiver interface of the present invention;

FIG. 12 is a simplified internal schematic block diagram of the ATM/AAL receiver block in FIG. 11;

FIG. 13 is a schematic block diagram illustrating the simplified AAL portion of the receiver datapath architecture;

FIG. 14 is the timing diagram of the AAL portion of the receiver in the AAL 3/4 mode of operation; and FIG. 15 is a block diagram of the embedded controller and peripheral circuitry wherein:

RN=Reference Number
VCI=Virtual Channel Identifier
GFC=Generic Flow Control
PT=Payload Type
RES=Reserved
CLP=Cell Loss Priority
MID=Message Identifier
SN=Sequence Number
MODE=AAL Type

BEST MODE FOR CARRYING OUT THE INVENTION

The ATM/AAL interface of the present invention is generic enough that it can be used in many B-ISDN applications, such as multimedia terminals.

Figure 1:
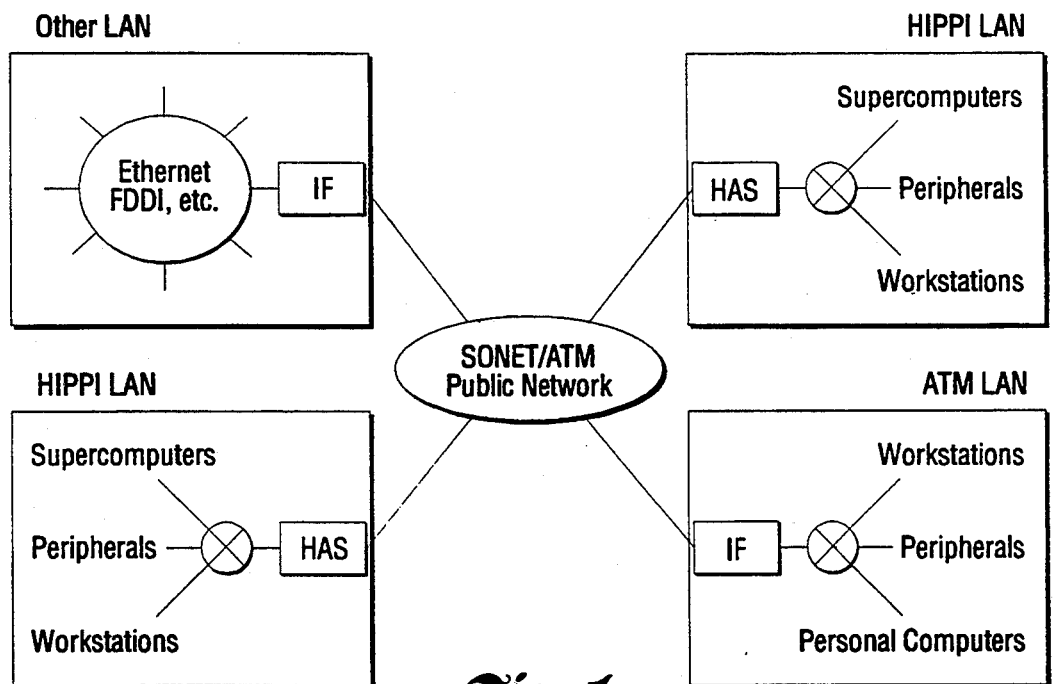
FIG. 1 is a schematic illustration of how the method and system of the present invention may be employed to provide access between HIPPI-based host computers and local area networks.

Referring now to the drawing figures, there is illustrated in FIG. 1 how an implementation of the present invention (as an ATM/AAL interface) may be used in the Nectar Gigabit Testbed. FIG. 1 is a simplified diagram showing how the Nectar HIPPI/ATM/SONET (HAS) interface is used to provide access between HIPPI-based host computers (high-performance workstations and supercomputers) and local area networks. In the Nectar Testbed, the HAS interface is used to connect HIPPI-based LANs at Carnegie-Mellon University and the Pittsburgh Supercomputing Center. The two sites are interconnected by a SONET transmission system operating at the OC-48 (2.488 Gb/s) rate. This ATM/AAL interface handles all of the AAL and ATM layer processing required between the HIPPI interface and the SONET multiplexing and transmission subsystem in the HAS.

ATM and AAL Transfer Protocols

The interfacing of distinct services to the B-ISDN requires their data streams to be adapted to the formats supported by the network. At the physical layer, SONET provides for the transport of ATM cells. ATM cells, which are fixed-size data units, provide for the transparent transfer of information with an agreed-upon grade of service. Adaptation of different services is provided at the AAL. The AAL performs different protocols that satisfy the wide range of service transmission requirements. At the present time, the protocols can be identified as supporting constant bit rate (CBR) and variable bit rate (VBR) services. The AAL protocols format the service data streams such that AAL information is ready to be transported in the ATM cells' payload.

Asynchronous Transfer Mode (ATM)

ATM is a multiplexing and switching technique which allows for the support of various services. The ATM cell has been defined to be 53 bytes long, consisting of a 5 byte header and a 48 byte cell body. The header will carry information for flow control, routing, and error detection. Service information will be placed in the 48 byte field along with the corresponding AAL overhead.

Adaptation Layer

Due to the diverse service traffic characteristics, different AAL protocols are needed. These protocols have been defined to handle CBR and VBR traffic.

The AAL is formed by two sublayers, the convergence (CS) and the segmentation and reassembly (SAR) sublayers. The convergence sublayer supports service-specific functions while the SAR sublayer supports service independent functions within the service class being processed.

In the CBR protocol, CS-Protocol Data Units (PDU) have not been standardized yet. SAR-PDUs are partitioned into 47 byte units to which an overhead byte SH is attached, as in FIG. 2a. This figure also shows how the total 48 byte SAR PDU is inserted into an ATM cell. The AAL overhead byte provides a 4 bit sequence number (SN) used, for example, to detect and indicate misdelivered data units. The second four bits, known as sequence number protection (SNP), have been proposed to protect the SN against error, but the final use of the SNP can be used for other purposes.

Figures 2A, 2B:
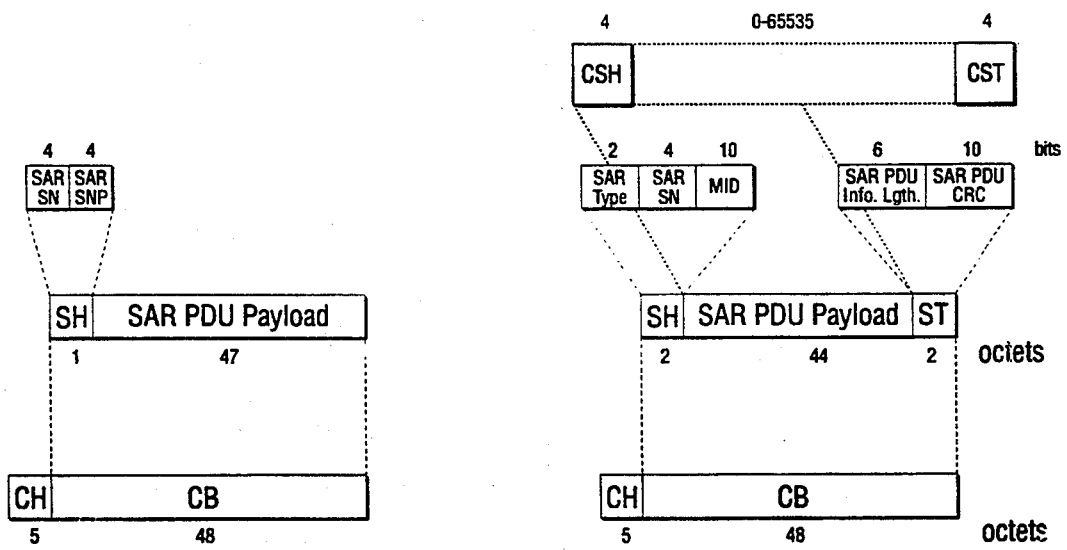

In the VBR protocol, CS-PDUs consist of a 4 byte header CSH and a 4 byte trailer CST with a variable length payload. The maximum payload is 65535 octets. CS-PDUs are partitioned into 44 byte SAR-PDUs to which a 2 byte header SH and a 2 byte trailer ST are added. The header SH carries information such as SAR type (2 bits), SN (4 bits), and MID (message identifier—10 bits). The trailer ST contains the length of the cell payload (6 bits) and a CRC field for error detection (10 bits). FIG. 2b shows the VBR AAL PDU and its placement in an ATM cell.

As mentioned previously, services transported by the ATM layer can be classified according to the type of bit rate (constant vs. variable), as well as by the connection mode (connection-oriented (CO) vs. connectionless (CL)) and the timing relation between the source and destination. These three parameters lead to the definition of the first four different AALs shown in Table 1.

TABLE 1

| Characteristic/Type | Characteristics of Different AAL Types | | | | |
|---|---|---|---|---|---|
| | Type 1 | Type 2 | Type 3 | Type 4 | Type 5 |
| Bit rate | Constant | Variable | Variable | Variable | Variable |
| Connection mode | CO | CO | CO | CL | CO or CL |

TABLE 1-continued

| Characteristic/Type | Characteristics of Different AAL Types | | | | |
| --- | --- | --- | --- | --- | --- |
| | Type 1 | Type 2 | Type 3 | Type 4 | Type 5 |
| Source-Destination Timing | Required | Required | Not Required | Not Required | Not Required |

The fifth type of AAL (also known as type 5 or SEAL—Simple and Efficient Adaptation Layer) is intended for high-speed data transfer applications and differs significantly from the original four AALs.

The B-ISDN Microprogrammed Machine

Several efforts using commercially available components, such as microprocessors, are being pursued to prototype different B-ISDN protocols. However, even when software is highly optimized to achieve as much speed as possible, there is a performance bottleneck which is compensated with external circuitry. One such bottleneck, for example, is the generation of Cyclic Redundancy Checks (CRC), often needed in the telecommunications area. It is the purpose of this section to describe an architecture which is software controlled and provides the required functional blocks and speed to satisfy the needs of the B-ISDN.

B-ISDN Programmed Electronic Circuit Description

This sub-section describes the high-level functionality of a B-ISDN programmed electronic circuit of the present invention. FIG. 3 shows its transmitter block diagram and the machine is generally indicated at 20. This machine 20 interfaces to a variety of service equipment 21 at its input port. These services could also include audio, video, and data from computer hosts or LAN interfaces. The machine 20 should provide to the interfacing equipment programmable handshaking control signals (handshake control line) from a handshake unit 32, since data transfer between the machine 20 and the equipment might require different protocols. The functionality of the machine 20 is controlled through Static Random Access Memory (SRAM) 22 which will be loaded through an external processor 24 with instructions tailored to control its internal architecture. By using instructions, which allows flexibility, the machine 20 performs the different transfer protocols required by the B-ISDN. The output of the B-ISDN programmed electronic circuit will then provide formatted data which will interface to an ATM/SONET interface 26, or to only a SONET interface. In the case of a SONET interface, it is conceived that it is possible to perform the ATM Layer protocol functions within the electronic circuit 20. A similar block will be needed for the unit's receive side and its software must provide the required functionality.

B-ISDN Programmed Electronic Circuit Architecture

FIG. 3 also shows a preferred architecture of the B-ISDN programmed electronic circuit 20 which includes a control area identified by a microinstruction unit 28 and dedicated hardware, such as a FIFO 30, a handshake unit 32, a register pad 34, high-speed counters 36 with programmable flags, and a CRC machine 38, all of which are to be controlled by the microinstructions. The handshake unit 32 can be programmed upon initialization of the electronic circuit 20 by the microinstruction unit 28 to perform some specific handshaking protocol. The register pad 34 is used to store information, such as the AAL overhead, which is then multiplexed with the data in the FIFO unit 30 into the machine's output through MOVE microinstructions which moves data from the FIFO to the machine's output. The register pads 34 could also contain programmable comparison functions, such as less than, greater than, and equal to, which are used for fast decision making by the microinstruction unit 28. The high-speed counters 36 with programmable flags can be used by the microinstruction unit to carry out fast decision making algorithms. For example, it is necessary to determine which byte of AAL overhead is being processed. It is possible to load the counter 36 with value 48 (number of bytes of the AAL unit), and make it count down with each instruction. The flags can be programmed to indicate the first two bytes and the last two bytes of the VBR payload, so that the microinstruction control can make a fast decision in the next instruction.

The CRC machine 38 could be dedicated or programmable so that a variety of CRC polynomials can be programmed. It might also contain a CRC=0 signal to identify errors when used in the receive side. The high speed counters 36 and the CRC machine 38 are shown in FIG. 4 as separate blocks, and it is likely that a number of these blocks might be necessary. For instance, extra units to process CS-PDUs might be required to perform PDU size monitoring and CRC generation. Finally, the microinstruction unit 28 contains the machine control. It indicates the next instruction and allows for branching of instructions. This block also contains a condition sub-block which, in combination with flags from the register pad 34, high-speed counters 36, CRC machine 38, and the microinstruction being executed, serves to decide on the next microinstruction to be executed.

B-ISDN Programmed Electronic Circuit Software Example

It is the purpose of this sub-section to give an example of how the electronic circuit 20 will operate. Assume that it is necessary to generate a Segmentation and Reassembly (SAR) function for the case of a CBR service. A simplified C language program for this particular implementation will be as follows:

```
COUNT = 0;
while (COUNT <= 47)
    {
    if (COUNT == 0)
        OUT = H1;
    else
        OUT = D [COUNT];
    COUNT++;
    }
```

In this program, OUT refers to the output of the electronic circuit which could be the input to the ATM/SONET interface. COUNT represents the value which is loaded into the electronic circuit's high-speed counters to monitor the while loop and which is incremented through the COUNT++ instruction until the loop condition is satisfied (i.e. COUNT=47). H1 represents a value in the register pad section which contains the overhead value of the CBR adaptation. D[COUNT]

refers to 47 bytes which are extracted from the FIFO, and are multiplexed with H1 into the OUT bus. The output of this program will give as a result; H1D[1]D[2] ... D[46]D[47]. Writing different programs and generating the proper instructions by using a compiler for the machine, allows for flexibility in implementing different transfer protocols which exist today, or will be developed in the future.

Implementation Considerations and Feasibility

The current bottleneck in the design of high-speed microprogrammed machines is in the access time of the memory components. This translates into how fast a microinstruction can be fetched and processed. Commercially available SRAMs with CMOS-level signals have an access time of 7 ns; BICMOS counterparts have an access time of about 2 ns. Let us now assume that we are required to build a microprogrammed machine which runs at the STS-3c rate. Implementing the machine in an "n"-bit-wide format will reduce the processing time "n" times. For the case of "n" equals 8, the system frequency will be 19.44 MHz. This is equivalent to 51.44 ns of time per byte of information. This translates into the requirement of fetching, loading information, and then executing a byte transfer to the output of our microprogrammed machine in one byte time. If we assume that the fetch time is 7 ns for the SRAM, we are left with 44.44 ns for the other instructions in the machine cycle. Using 1.2 $\mu$m CMOS technology, it is feasible to achieve these speeds. This has been demonstrated by the implementation of VLSI chips such as the prototype Bellcore STS-3c Framer and the prototype Bellcore ATM Layer chips as described in T. Robe and K. Walsh, "A SONET STS-3c User Network Interface Integrated Circuit", *IEEE JOURNAL ON SELECTED AREAS IN COMMUNICATIONS*, Vol. 8, pp. 732–740, June 1991; and C. A. Johnston and H. J. Chao, "The ATM Layer Chip: An ASIC For B-ISDN Applications", *IEEE JOURNAL ON SELECTED AREAS IN COMMUNICATIONS*, Vol. 8, pp. 741–750, June 1991, respectively.

Supporting higher speeds, such as STS-12 or STS-24, could be achieved through the application of parallel processing and the increase of the byte format to 16 or 32 bits. For instance, if we assume a 25 ns cycle time, using 8 bits, this translates to a machine running at 40 MHz, or equivalently at 320 Mb/s, an achievable frequency for 1.2 $\mu$m CMOS. If the byte format is 16, this translates into 640 Mb/s. Similarly, if the byte format is 32 then we can achieve 1.244 Gb/s. If SRAMS are designed on-chip, and we make use of submicron BICMOS technology, we might improve the SRAM's access time of present commercial components (2 ns) and prototype a machine at 75 MHz, with 32 bit format, which is equivalent to 2.4 Gb/s (STS-48).

Example of Application of Present Invention

As previously mentioned, the Nectar testbed connects gigabit LANs at Carnegie-Mellon University (CMU) and the Pittsburgh Supercomputing Center (PSC). The two LANs are based on the High Performance Parallel Interface (HIPPI) protocols and serve to link supercomputers, high-end workstations and peripherals at the two sites. The method chosen for linking the two sites is to convert HIPPI data packets into ATM cells and transport the ATM cells over a SONET OC-48 (2.488 Gb/s) link. This method is implemented in a HIPPI/ATM/SONET (HAS) network interface prototype whose main components are shown in the block diagram of FIG. 5.

The basic functions performed in the HAS are as follows. In the transmit direction HIPPI packets from a HIPPI-based host computer or router are terminated on the HIPPI fast buffer (HIPPI FB) module. The data within the packet, along with routing information, is passed to one of eight ATM/AAL modules, each corresponding to one SONET STS-3c channel. The ATM/AAL modules convert the routing information to a virtual circuit/virtual path (VCI/VPI) combination and segment the HIPPI data into ATM cells. The ATM cells are then passed to the SONET module where they are mapped into SONET STS-3c (155.52 Mb/s) channels. Eight STS-3c channels are used for one HIPPI channel; the testbed will accommodate up to 16 STS-3c channels so that the eight additional channels could be used for a second HIPPI channel or for other related purposes. The sixteen parallel STS-3c channels are then multiplexed up to the STS-48 rate and converted to an optical OC-48 signal for transmission across the network. At the receive side, the OC-48 signal is received, converted to electrical STS-48 and demultiplexed to sixteen parallel STS-3c channels. ATM cells are mapped out of the SONET payload and reassembled into HIPPI data units. ATM routing information is converted to HIPPI routing information and the HIPPI packet is then reconstructed. The Management and Signaling Processor (MSP) shown in FIG. 4 is responsible for connection management and for monitoring the status and performance of the modules within the HAS interface. The architecture of the ATM/AAL interface is generic so that, for example, the HIPPI FB module could be replaced by another high-speed data communications interface that supports video, audio, or other data transmission protocols.

The architecture and implementation of the ATM/AAL module and its application in the HAS interface is described hereinbelow.

Mapping HIPPI Into SONET/ATM

The ATM/AAL module performs the protocol conversion necessary to map HIPPI data into ATM cells. The HIPPI FB module, shown in FIG. 4, is responsible for performing error checks on HIPPI data bursts, assembling data bursts into packets, and removing the header from the packet to form an upper layer protocol data unit (ULPDU). The HIPPI FB then passes the ULPDU, along with a header consisting of a reference number (RN) and packet size (PACSIZ) to the ATM/AAL module.

The RN maps to a range of HIPPI addresses used to determine the destination of the ULPDU. The HAS supports both control (e.g. signaling) and data traffic, and unique RNs are assigned to both types of traffic. In this implementation, the RN is 12 bits long. The PACSIZ specifies the length of the ULPDU in bytes; the ULPDU can have any format up to 64K bytes in length.

The ATM/AAL module then converts the information transferred from the HIPPI FB module to ATM cells as shown in FIGS. 5a and 5b. A complete description of the information disclosed therein can be found in *BELLCORE TECHNICAL ADVISORY*, TA-NWT-001113, "Asynchronous Transfer Mode and ATM Adaption Layer Protocols Generic Requirement", Issue I, August 1992.

Both constant bit rate (CBR—AAL 1, FIG. 5a) and variable bit rate (VBR—AAL 3/4, FIG. 5b) processing are shown. First, the Convergence Sublayer (CS) header (CSH) and CS trailer (CST) are added to the ULPDU (for VBR only). Then, the CS protocol data unit is segmented according to the appropriate Segmentation and Reassembly (SAR) Sublayer protocols. The SAR protocol data units (PDU) become the payload of the ATM cells and the appropriate ATM cell header is added. The RN is mapped to a combined VCI/VPI/MID value and points to a MODE value that controls which AAL (type 1, 3 or 4) is performed, while the PACSIZ is used for error checking. The inverse operations take place in the destination HAS.

Control and data traffic are handled differently in the ATM/AAL module. While data traffic is processed as shown in FIGS. 5a and 5b and passed directly to the SONET interface, control traffic must be identified and directed to the MSP for processing. For example, to request a connection, the HIPPI FB passes a signaling packet to the ATM/AAL module which is identified by a preassigned signaling reference number. Within this packet is the RN to be used for this connection. This packet is diverted to the MSP, which converts the RN to a VCI/VPI/MID combination after negotiation with the network call processor shown in FIG. 4. Once the connection is established, user data can be sent using the RN and VCI/VPI/MID values negotiated.

ATM/AAL Transmitter Functional Description

The basic function of the ATM/AAL transmitter subsystem is to convert incoming packets to ATM/AAL cells and insert them into the SONET network.

ATM/AAL Transmitter Subsystem

FIG. 6 shows a high-level block diagram of the ATM/AAL transmitter subsystem. It consists of an Embedded Controller (EC) 40, a Transmitter Signaling Interface (TSI) 42, a Transmitter Look-up Table (TLT) 44, an ATM/AAL transmitter 46, a FIFO 48, and an AAL-CRC (cyclic redundancy checker) 50. Upon system initialization, the EC 40 sends messages to the MSP to announce its existence. The MSP then instructs the EC 40 to enter ATM header, MID, SN, and MODE values in the TLT 44 corresponding to the MSP-to-network signaling RN after meta-signaling procedures are complete. Meta-signaling procedures provide the initial means for the HAS to communicate with the network by being assigned a permanent signaling VCI which is used by the HAS as long as the HAS is permanently connected to the network. As signaling messages are transferred, the EC 40 checks for transfer correctness. The MSP also sends to the EC 40 MSP-to-network messages, which it temporarily stores in the TSI 42. The TSI 42 informs the ATM/AAL transmitter 46 via a PKTRDYSIG signal that a signaling packet is ready for transmission.

The ATM/AAL transmitter 46 obtains information from the TSI 42 through signals RQDATAESIG and RQDATAOSIG. As a message is transferred, the ATM/AAL transmitter 46 latches the RN and uses it as a pointer in the TLT 44 where the MODE value is read and used to configure the ATM/AAL transmitter 46 to perform the appropriate AAL protocol. Other related overhead, for instance VCI, MID and SN, is also retrieved from the TLT by the ATM/AAL transmitter. As the ATM/AAL transmitter 46 performs the AAL protocol, it stores the AAL information and the first four bytes of the ATM header, which are read from the TLT 44, into the external FIFO 48. The ATM/AAL transmitter 46 also provides the same output to the AAL-CRC 50 which generates the AAL CRC check and inserts it into the FIFO 48 at the required AAL format byte position.

When there is enough information in the FIFO 48 to fill a cell, the ATM/AAL transmitter's 46 Cell Assembler sub-function adds the ATM CRC-8 (HEC) byte and transfers the ATM cell to the SONET interface through the DATAOUT port. The Cell Assembler portion of the ATM/AAL transmitter 46 also inserts unassigned cells into the SONET network when required. The FHEN signal controls the transfer of ATM cells to the SONET interface.

A host, interfacing to the ATM/AAL subsystem, can send two types of information—either signaling messages to the MSP or data to the network. Whenever the host is ready to send a signaling message to the MSP (e.g. to open a connection), the message is announced to the ATM/AAL transmitter 46 through the PKTRDY signal. The information is then retrieved by the host by signals RQDATAE and RQDATAO through the DATAIN port. If the host and the TSI place simultaneous access requests, the TSI is given priority. The ATM/AAL transmitter 46 routes signaling information to the MSP by providing the packet to the TSI 42, which in turn informs the EC 40 to transfer it to the MSP. The ATM/AAL transmitter 46 recognizes signaling messages by signaling RN values. After the MSP processes the host-to-MSP signaling, it provides back to the EC 40 the signaling message, which is then transferred to the network as described earlier. If a host sends data to an end user, a similar scenario to the MSP-to-network process occurs, so that data can be formatted into AAL 1, 3, or 4, depending on the corresponding TLT entry.

AAL/ATM Transmitter Chip

FIG. 7 shows a high-level block diagram of the AAL/ATM transmitter chip. It consists of two sections, the AAL section 710 and the ATM section 712. The AAL section 710 is in charge of moving information from the service side. Information is received through the DATAIN input by the control of the RQDATA signal which is generated by the AAL Controller 714 every time a PKTRDY (packet ready) signal is detected. Data is transferred in a 16-bit word at a speed of 9.72 MHz. As information is received, the RN is stored in a register (REG) 716, and it is used as an address pointer to external RAM which contains transmission overhead and control values as will be described later.

A MODE input is provided to the AAL Controller 714 from external RAM to identify which AAL protocol will be performed on a given packet. When the AAL Controller 714 receives the PACSIZ from the DATAIN, it decrements this value as data is moved across the AAL section 710 to determine, with the MODE input value, the control signal sequence generation to obtain the precise AAL protocol. MODE input value indicates whether AAL 1, 3 or 4 is to be supported.

The AAL Section 710 interfaces to two 8-bit external FIFOs (shown as one FIFO in FIG. 6) by writing information to them with the WRFIFO signal. First, ATM cell header overhead (32 bits) is multiplexed (MUX1) from an external RAM into the FIFOs in 16-bit wide words. Then AAL overhead is taken from either the external RAM or from within the internal registers 718. For example, for AAL 1 the Sequence Number (SN) byte overhead is taken from the AAL overhead external RAM, and it is incremented by one with the adder 720 shown. The result is stored back in the RAM to be used for the next cell in the same connection. A similar function is performed for AAL 3/4 but the SN is multiplexed in a different cell field in accordance with the AAL standards. For AAL type 3/4, Segmentation and Reassembly cell TYPE overhead is stored in the internal registers 718 under command of the AAL Controller 714. This overhead indicates whether each cell is the beginning, continuation, end, or single segment message. The cell TYPE overhead is generated in the AAL Controller 714 by decrementing the value of PACSIZ, and monitoring the remaining size of the data to be transmitted. User data is multiplexed directly into the FIFOs, thus forming for instance, an AAL 3/4 ATM cell (without the CRC8).

Every time there is enough information in the external FIFOs to assemble an ATM cell, the AAL Controller 714 generates a Cell_Ready signal (as shown in FIG. 7), and informs the ATM Controller 722 to generate a valid ATM cell. The ATM Controller 722 is synchronized to the physical layer circuitry, which could be for instance SONET, by an external system clock shown as CLK. A signal HEN is also provided to delimit the position of cells in the physical layer. When no data is transferred to the network, the ATM section 712 generates unassigned cells which are used in the network to synchronize the ATM receiver. Cells are inserted in the network by taking information from the external FIFOs because as previously mentioned, that is where the user data and information is assembled. The data is taken one byte at a time, and multiplexed into the DATAOUT output, by steering the external FIFOs, with the RDFIFOE and RDFIFOO signals.

The ATM Section 712 generates ATM cells by inserting the ATM header which is multiplexed into the network. The header bytes are fed back into the CRC-8 generator 724 whose function is to generate the Cyclic Redundancy Check, and to insert another ATM header byte under control of the ATM controller 722. A description of this CRC parallel machine can be found in C. A. Johnston, H. J. Chao, "The ATM Layer Chip: An ASIC for B-ISDN Applications", *IEEE JOURNAL* on Selected Areas in Communications, Vol. 9, pp. 741–750, June 1991. The AAL/ATM transmitter provides for the transfer of inband signaling information to a signaling module.

ATM/AAL Transmitter Architecture

The primary objective of the ATM/AAL transmitter architecture is to merge common datapath and control functions among the different AAL protocols to obtain a generic architecture. As an example, a simplified datapath architecture of the transmitter is shown in FIG. 8 which should be read together with the timing diagram of FIG. 9. The architecture shows a multiplexer composed of tri-state buffers and function blocks such as the SAR TYPE 52, SEQUENCE NUMBER 54, and PACKET LENGTH 56, which generate the AAL overhead. The REFOUT 55 is where the pointer to the TLT is stored. The transfer unit 57 performs the handshake between the service and the machine to transfer information therebetween.

FIG. 9 shows the timing diagram to control the generation of AAL 3/4 in FIG. 8. Data is transferred from a service interface board as 16-bit words at 9.72 MHz. The signal CLK represents the system clock which is used to drive the synchronous internal circuitry. The PKTRDY signal announces to the ATM/AAL transmitter 46 that a packet is ready for transmission. Signals RQDATAO and RQDATAE are then activated and, one clock cycle later, they enable data at the DATAIN port. The RN word is immediately latched and used to index into the TLT through the REFOUT output. Since the RN points to the TLT, the MODE value (AAL 3/4) and VCI/VPI (not shown) are accessible and ready for use.

Internal control signals such as SAR01, are then generated, as shown, to enable the different overhead values into the PDOUT port. The CS signals enable the Convergence Sublayer overhead, while the SAR signals enable the Segmentation and Reassembly overhead. User data is inserted using signals ENDATAO and ENDATAE and its transfer is controlled by RQDATAO and RQDATAE. The output on PDOUT shows the AAL 3/4 formatted data consisting of 4 bytes of SAR overhead (header and trailer), which includes the MID from the TLT 44. The CRC value byte position is set to zero, through the last tri-state buffer in FIG. 8. The CRC value that is set to zero is then replaced by the output of the external CRC-AAL machine shown in FIG. 6. In this particular example, as shown, there are 36 bytes of user data and 8 bytes of CS overhead at PDOUT.

FIG. 10 shows a timing diagram for the transmitter 46 in FIG. 6 to generate the AAL 1 format. The first difference, compared with the AAL 3/4 case, is the RQDATAE and RQDATAO signals. AAL 1 only requires one byte of overhead, and as such, the overhead byte SAR01, which is internally generated in the SEQUENCE NUMBER 54, and the user byte D0 must be enabled to the PDOUT port simultaneously. D0 is made accessible by RQDATAO while RQDATAE disables transfer data during that time, as shown by the line above D0 in the DATAIN bus. It is also important to observe that the only overhead control signal that is enabled is SAR01, while the other signals are disabled, so that no access to AAL 3/4 overhead is permitted. The SEQUENCE NUMBER 54 output is placed in the most significant bits of the first PDOUT word in contrast to the AAL 3/4 case, where the SN is placed in bit positions 5 through 2 of the most significant byte in the word. The final result is PDOUT, which consists of a single byte of overhead and 47 bytes of user data.

ATM/AAL Receiver Functional Description

The ATM/AAL receiver subsystem performs ATM cell disassembly and AAL functions necessary to retrieve information from the SONET network. After packets are reassembled in the format specified in FIGS. 5a and 5b, the receiver informs the service interface to transfer the information.

ATM/AAL Receiver Subsystem

FIG. 11 shows a block diagram of the ATM/AAL receiver subsystem. When the receiver is powered up, the MSP transfers to an EC 60 control messages to set up a Receiver Look-up Table 62 (RLT) including an entry for signaling channels.

When a signaling VCI set-up message is received, the ATM/AAL receiver subsystem provides the ATM header to the RLT 62 which compares it to the signaling channel entry. If the header matches the RLT entry, the ATM/AAL receiver performs a cell disassembly function, generates an RN value if this is the beginning of a packet, reads the MODE value that indicates which AAL protocol to perform, and stores the signaling data in the Receiver Signaling Interface (RSI) 64 with the RWRSIG signal. The EC 60 then transfers the information to the MSP which analyzes the data and instructs EC 60 to enter a signaling VCI/VPI value in the RLT 62. The signaling VCI/VPI value is then perpetually kept as a means to communicate with the network.

After signaling ATM overhead (VPI, VCI, etc.) has been assigned, the receiver is ready to process network-to-MSP instructions to assign user information VCI/VPIs. Whenever a connection is requested and a user information (data traffic) VCI/VPI value is assigned, the MSP also instructs the EC 60 to send a signaling message to the host, via the RSI 64, to inform it of the RN value that corresponds to the given connection. VCI/VPIs for user information are entered into the RLT 62 in a similar manner as in the signaling procedure.

When user information destined for the host is received, the ATM/AAL receiver also performs the cell disassembly function and the required AAL processing based on the MODE value read from the RLT 62. As the message is received, data (excluding the ATM and AAL overhead except for filling bytes indicated by the user information length field in the case of the AAL 3 and 4 formats) is stored in FIFO1 66. Simultaneously, the AAL-CRC 88 checks for CRC transmission errors. When user information in a cell is stored in FIFO1 66 and no errors have been detected by the receiver via signal CRCCORRECT, user data is transferred to FIFO2 68 (minus the filling bytes) where a whole PDU is reassembled. The packet in FIFO2 68, which includes a RN and PACSIZ overhead, is announced to the service through the PKTRDY signal. The service interface retrieves the packet with signals RQDATAE and RQDATAO.

AAL/ATM Receiver Chip

In general, the AAL/ATM Receiver performs ATM cell disassembly, and AAL 1, 3, 4 functions necessary to retrieve information from the network. As in the case of the transmitter, the receiver also consists of two sections as depicted in FIG. 12. The ATM section 812 is synchronized to the network with CLK, and it delimits the incoming ATM cells by receiving the HEN signal at the R-ATM Controller 822. ATM cells arrive at the DATAIN port in a byte-wide format at 19.44 MHz. The R-ATM Controller 822 stores the ATM Virtual Circuit Identifier (VCI) in an internal register (VCI Register) 816, which is used as a pointer to an external Content Addressable Memory (CAM) which is part of the RLT. As the ATM header is received, the CRC-8 Detector 824 checks that there are no transmission errors in the header, and informs the R-ATM Controller 822 through the CRCOK signal.

When a valid connection is detected, the external CAM provides a MATCH signal to the R-ATM Controller 822. The MATCH and CRCOK are used to generate the WRFIFOE1 and WRFIFOO1 signals to drive two external byte-wide FIFOs. Only the ATM cell payload is written into the external FIFOs (FIFO1) in a 16-bit wide format, the ATM header is stripped off.

After the cell payload has been stored in FIFO1, a Cell_Ready signal announces to the AAL section 810 that a cell is ready for AAL processing. The AAL section 810 identifies the AAL protocol to be performed at the R-AAL Controller 814, by receiving the MODE input from the CAM for a given connection. It is also a function of the AAL section 810 to process AAL overhead which is stored by the ATM section 812 in the Registers and Comparators (R&G) 818. R&G 818 generates an OOK (Overhead OK) signal to announce that no overhead errors have been detected. AAL Overhead bytes are obtained from external RAM, for instance a RAM holds the Message Identifier Number (MID). Similarly, the RAM stores the SN overhead which needs to be incremented (with the shown adder) on a per cell arrival basis, and stored back into the RAM for detection of missing cells.

The R-AAL Controller 814 moves information from FIFO1 with the RDFIFO1 signal, and it generates a WRFIFO2 signal to write user data, without AAL overhead, into an external FIFO2. A number of queues can be supported by using the QUEUE signals from the external CAM. In this particular case, four external 64K FIFOs can be supported with 2 bits. As packets are reassembled, they are passed to the service side. The RN is obtained from the external CAM and the PACSIZ, in the PACSIZ Register 826, is obtained from the ATM section 812 for AAL 3 or 4, and it is set to 47 for AAL 1.

The R-AAL Controller 814 sends information to the service side every time a PDU has been reassembled. When PKTRDY is received, the RQDATA signal is used to generate the RDFIFO2 signal that reads the different external queues. First the R-AAL Controller 814 multiplexes the RN, then the PACSIZ, and then it triggers the RDFIFO2 signal as the RQDATA signal is received. The AAL section 810 processes information at 9.72 MHz while the Service Interface can read information at its own speed.

As in the case of the Transmitter, the Receiver also supports inband signaling. Signaling packets can be filtered out of the network and provided to the RSI in FIG. 11. It is also possible for a signaling module to send information to the service interface through the SIGDATA bus in FIG. 12.

ATM/AAL Receiver Architecture

A simplified block diagram of the receiver is shown in FIG. 13 and can be interpreted using FIG. 14, which shows the timing diagram for the processing of AAL 3/4. Data is retrieved from the Cell Disassembler at the PDIN port and provided to all function blocks. When the first AAL byte is presented at PDIN, signal ENSAR0 latches the first 2 bits of information in the SAR TYPE 72. The SAR TYPE 72 checks the incoming value (which indicates whether a SAR protocol data unit is the beginning, continuation, end of a message or a single segment message) and determines if it is correct. The SAR TYPE 72 contains a finite state machine that resets upon the arrival of a beginning-of-message and single-segment-message indicator and instructs MID 76 to retrieve the MID value being received. The SAR TYPE 72 predicts the next expected states based on the incoming CS overhead value which indicates the PDU length and it is stored in the CS block 78.

The ENSAR0 signal is also used to retrieve the AAL 3/4 SN, which arrives in bits 5 through 2 of the first AAL byte and is stored in the SEQUENCE NUMBER block 74 through the tri-state buffer being controlled by the AAL 3/4 signal. The MID value is stored in the MID block 76 whenever the beginning of a packet is detected and it is compared with every consecutive cell to check for packet integrity. Signal ENSIZE is used by the CS block 78, in this particular example, to latch the second header and trailer convergence overhead byte, which contains the length of the received PDU. As the AAL overhead is examined, the AAL user data and filling overhead (if any) is stored in FIFO1 80 with signal WRFIFO1 through a DELAY UNIT 82 that transforms the 8-bit data bus into a 16-bit bus labeled INFIFO1.

After the user data is stored in FIFO1 80, the SAR trailer overhead bytes are stored in the USER INFO.-LENGTH and CRC blocks 84 and 86, respectively, with the ENSAR47 and ENSAR48 signals. The value of the CRC block is compared to the result of the AAL-CRC machine 88 to generate a CRCCORRECT signal. The value in the USER INFO.LENGTH block 84 is used to remove any filling bytes in FIFO1 80 as data is being sent to FIFO2 90 for PDU reassembly. Data is transferred to FIFO2 90 only if the SAROK, SNOK, MIDOK, CSOK, ENUSERDATA, and CRCCORRECT signals are valid, otherwise the data is flushed. It is important to note that upon receiving a BOM (beginning-of-message identification), the RN and PACSIZ values are also written to FIFO2 90 with signals ENRN, SIZE and WRFIFO2 to reconstruct the service interface format. Finally, when a PDU has been fully recovered, a PTKRDY signal indicates to the service interface to retrieve the information with the RQDATAO and RQDATAE control signals, which behave in a similar way as in the transmitter. For cases where AAL 1 is performed, only the ENSAR0 and SEQUENCE number block 74 perform their functions; all other blocks are disabled.

Embedded Controller and Loop-Up Table Functional Description

Embedded Controller Functional Description

The embedded controller (EC) illustrated in FIG. 15 manages the transmitter and receiver look-up tables and performs status and error monitoring. The main element of the embedded controller is a high performance 32-bit embedded processor.

ATM/AAL Transmitter Look-Up Table

Both the ATM/AAL transmitter look-up table (TLT) and receiver look-up table (RLT) serve as data stores for ATM/AAL level routing and control information. Despite each table serving similar purposes, their format and operation is quite different. The TLT is referenced to construct ATM/AAL cell headers while the RLT is employed to filter incoming ATM cells. The structure of the TLT is depicted in FIG. 15. Each table entry consists of 32 bits of ATM header information (bits 17-48) and 16 bits of AAL control information (bits 1-16). The RN is 12 bits.

The 12-bit reference number (RN) serves as the index into the TLT. The data values of the indexed TLT location are inserted into the header fields of the ATM cell constructed for the associated PDU packet. As stated previously, entries within this table are created by the EC. The sequence number (SN) is the only field within the TLT that is also updated by the ATM/AAL transmitter.

ATM/AAL Receiver Look-Up Table

The ATM/AAL receiver screens all incoming ATM cells, discarding those that do not match its entries. The receiver accomplishes this filtering process through the use of a content-addressable memory (CAM) device. In contrast to random access memories (RAMs) where the contents of an address is accessed, CAM devices act as a search engine. Given a data value, a CAM generates a match signal if any of its entries match the data value.

Designed as part of the RLT, the CAM allows partitioning of its 64-bit wide memory array as a mixture of CAM and RAM segments. Given this flexibility, the present implementation reserves 32 bits for associated data. The structure of the RLT, including the CAM, is also shown in FIG. 15. The VCI/VPI values are stored in bits 48-26. The reference number is contained in bits 14-25 and the mode value is in bits 11-13. The MID is in bits 1-10. The RAM portion of the RLT contains SN at bits 1-4 and the RN which is a pointer of 12-bits in length.

The CAM section of the memory array stores the list of VCI/VPI values currently assigned to the channel. For each incoming ATM cell, the receiver instructs the CAM to search its list for a VCI/VPI value equivalent to the one in the cell header. An output signal from the device indicates whether or not a match was found. If a match does not exist, the cell is dropped. Otherwise, the receiver retrieves the associated data from the RAM section of the matching VCI/VPI location. The receiver uses the RN contained within the associated data as an index into a secondary RAM table. A single field makes up this table which is used to maintain the next expected SAR segment SN for a given connection.

Implementation

At power up or when the system is reset, the EC configures itself by running a built-in initialization routine. Once complete, the controller begins to execute the control system software. The first sequence of instructions are dedicated to initialization of the CAM device. This set of instructions must be executed prior to accessing the device and need only to be executed once after EC initialization.

Immediately after configuring the devices, the EC begins to continuously poll each of the signaling interfaces (FIFOs 1 through 6 in FIG. 15). At each signaling interface (i.e. MSP, transmitter and receiver), the EC checks the FIFO empty flag (EF in the flag register) to determine whether or not a signaling PDU has arrived. If no PDU exists, the EC moves onto the next signaling interface. Otherwise, the EC reads the PDU into its own memory system and processes it based on its type. The EC must handle each type of signaling packet since all signaling information passes through it. In the simplest case, the EC just forwards a PDU into an appropriate outgoing FIFO without alteration. PDUs dedicated to updating entries of the look-up tables consume the most machine cycles of the EC.

When the flag is full (i.e. /FF in the Flag Register), the EC resets the contents of all of the FIFOs and begins the polling sequence again.

While the best mode for carrying out the invention has been described in detail, those familiar with the art to which this invention relates will recognize various alternative designs and embodiments for practicing the invention as defined by the following claims.

What is claimed is:

1. In a high speed telecommunications network, a method for processing different transfer protocols including a desired transfer protocol for each protocol data unit (PDU), the protocols supporting different service types to be handled by the network, the method comprising the steps of:

providing a programmable electronic circuit having an input port, an output port and a programmable internal architecture, the input port adapted to receive data from a service interface and the output port adapted to provide formatted data to a high speed network interface;

storing instructions in a memory which instructions correspond to different programmable internal architectures of the programmable electronic circuit;

retrieving a set of instructions from the memory corresponding to a desired programmable internal architecture of the programmable electronic circuit; and controlling the programmable electronic circuit in response to said set of instructions to obtain the desired programmable internal architecture of the programmable electronic circuit, the desired programmable internal architecture being capable of processing data having a format corresponding to the desired transfer protocol for each PDU.

2. The method as claimed in claim 1 wherein the transfer protocols are Asynchronous Transfer Mode/Asynchronous Transfer Mode Adaptation Layer (ATM/AAL) protocols.

3. The method as claimed in claim 1 wherein the memory is a Random Access Memory (RAM) or Content Addressable Memory (CAM).

4. The method as claimed in claim 1 wherein the programmable electronic circuit includes a programmable handshake unit wherein the step of storing includes the step of storing a first subset of the set of instructions in the programmable handshake unit so that the programmable handshake unit can provide desired handshaking control signals to the service interface of the network.

5. The method as claimed in claim 4 wherein the programmable electronic circuit includes a programmable register pad, wherein the step of storing includes the step of storing a second subset of the set of instructions in the programmable register pad and wherein the method further comprises the step of multiplexing the second subset with the data stored in the memory unit into the output port.

6. The method as claimed in claim 5 wherein the second subset represents Asynchronous Transfer Mode/Asynchronous Transfer Mode Adaptation Layer (ATM/AAL) overhead.

7. The method as claimed in claim 5 further comprising the step of comparing the second subset with incoming network information in the programmable register pad.

8. The method as claimed in claim 1 further comprising the step of storing data received at the input port at a memory unit of the programmable electronic circuit.

9. The method as claimed in claim 1 further comprising the step of storing data received at the input port at a FIFO memory unit of the programmable electronic circuit.

10. The method as claimed in claim 1 further comprising the step of storing a third subset of the set of instructions to configure an instruction control unit, counters with their programmable flags and a cyclic redundancy check machine of the programmable electronic circuit.

11. In a high speed telecommunications network, a system for processing different transfer protocols including a desired transfer protocol for each protocol data unit (PDU), the protocols supporting different service types to be handled by the network, the system comprising:

a programmable electronic circuit having an input port and an output port, the programmable electronic circuit having a programmable internal architecture wherein the input port is adapted to receive data from a service interface and the output port being adapted to provide formatted data to a high speed network interface;

a memory having instructions stored therein corresponding to different programmable internal architectures of the programmable electronic circuit;

means for retrieving a set of instructions from the memory corresponding to a desired programmable internal architecture of the programmable electronic circuit; and means for controlling the programmable electronic circuit to obtain the desired programmable internal architecture of the programmable electronic circuit, the desired programmable internal architecture being capable of processing data having a format corresponding to the desired transfer protocol for each PDU.

12. The system as claimed in claim 11 wherein the transfer protocols are Asynchronous Transfer Mode/Asynchronous Transfer Mode Adaptation Layer (ATM/AAL) protocols.

13. The system as claimed in claim 11 wherein the memory is a Random Access Memory (RAM) or Content Addressable Memory (CAM).

14. The system as claimed in claim 11 further comprising means for storing the instructions in the memory.

15. The system as claimed in claim 11 wherein the programmable electronic circuit includes a programmable handshake unit and wherein the system further includes means for storing a first subset of the set of instructions in the programmable handshake unit so that the programmable handshake unit can provide desired handshaking control signals to the service interface of the network.

16. The system as claimed in claim 11 wherein the programmable electronic circuit includes a memory unit for storing data received at the input port.

17. The system as claimed in claim 16 wherein the memory unit is a FIFO memory unit.

18. The system as claimed in claim 16 wherein the programmable electronic circuit includes a programmable register pad, which stores a second subset of the set of instructions, and wherein the system further includes a multiplexer for multiplexing the second subset with the data stored in the memory unit into the output port.

19. The system as claimed in claim 18 wherein the second subset represents Asynchronous Transfer Mode/Asynchronous Transfer Mode Adaptation Layer (ATM/AAL) overhead.

20. The system as claimed in claim 18 wherein the second subset is compared with incoming network information in the programmable register pad.

21. The system as claimed in claim 11 further comprising means for storing a third subset of the set of instructions to configure an instruction control unit, counters with their programmable flags and a cyclic redundancy check machine of the programmable electronic circuit.

* * * * *